Figures 1, 2:
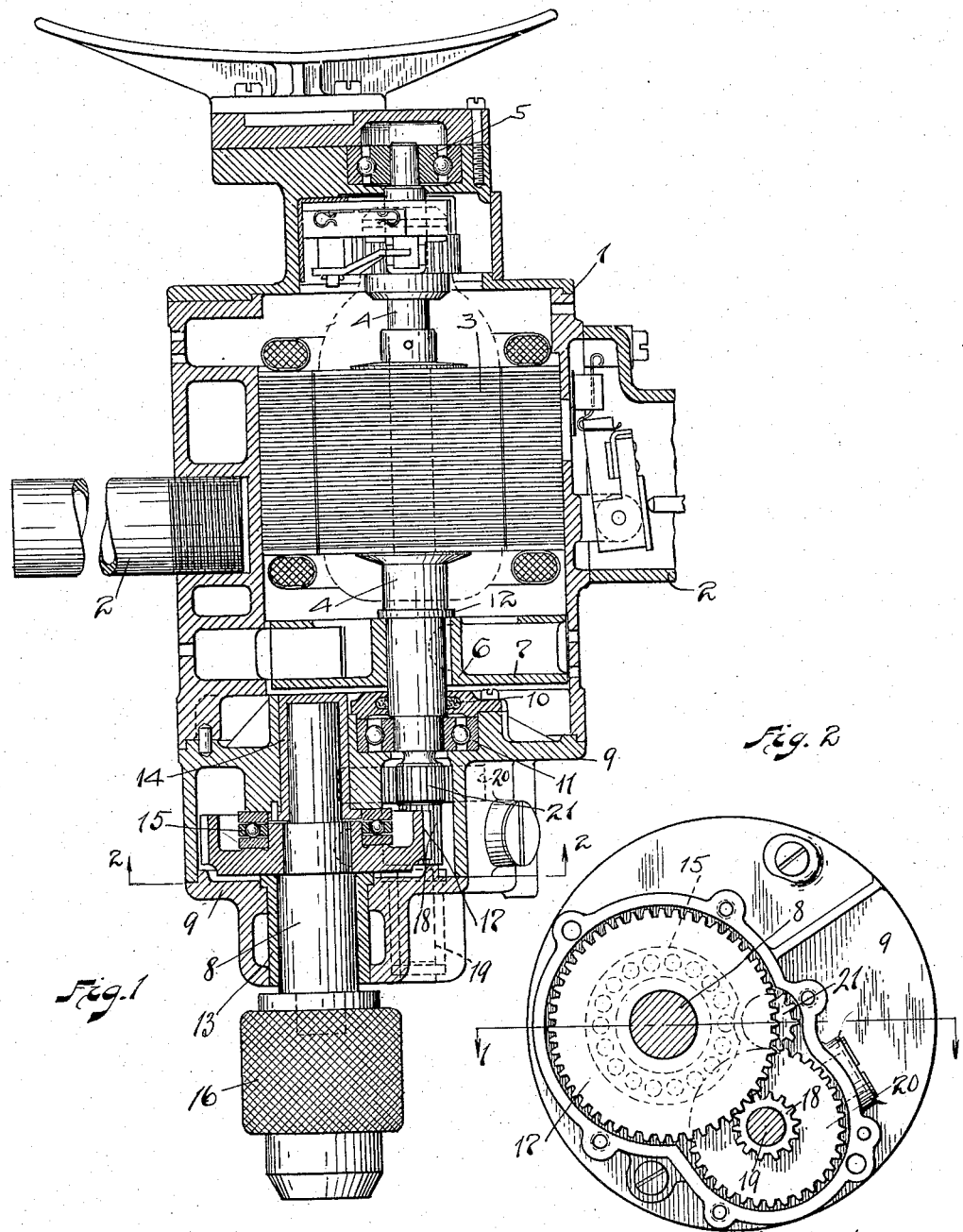

F. SCHNEIDER.
ELECTRICALLY OPERATED TOOL.
APPLICATION FILED FEB. 20, 1913.

1,172,169.

Patented Feb. 15, 1916.

Witnesses=
Oliver M. Kappler.
Anna L. Gill

Inventor
Franklin Schneider
By Fay & Oberlin
Attorneys

UNITED STATES PATENT OFFICE.

FRANKLIN SCHNEIDER, OF CLEVELAND, OHIO, ASSIGNOR TO THE VAN DORN & DUTTON COMPANY, OF CLEVELAND, OHIO, A CORPORATION OF OHIO.

ELECTRICALLY-OPERATED TOOL.

1,172,169.      Specification of Letters Patent.      Patented Feb. 15, 1916.

Application filed February 20, 1913. Serial No. 749,646.

*To all whom it may concern:*

Be it known that I, FRANKLIN SCHNEIDER, a citizen of the United States, and a resident of Cleveland, county of Cuyahoga, and State of Ohio, have invented a new and useful Improvement in Electrically-Operated Tools, of which the following is a specification, the principle of the invention being herein explained and the best mode in which I have contemplated applying that principle, so as to distinguish it from other inventions.

The subject of the present invention is an electrically operated tool intended primarily for use in connection with drills and the like. It is a matter of extreme difficulty in such tools to secure a construction of casing and a disposition of the gears and the bearings which will entirely prevent the introduction of lubricant into the motor chamber, as lubricant in this chamber will of course get into the windings of the motor and will practically ruin the same in a short time.

In the present invention I have so constructed the casing and have so disposed the various operating parts that it is impossible for lubricant to escape from around the gears and the bearings for the various shafts and secure entrance to the casing which incloses the motor.

To the accomplishment of these and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: Figure 1 is a central section on the line 1—1 Fig. 2, but showing certain details in elevation; and Fig. 2 is a section on the line 2—2, Fig. 1.

The general features of all electrically operated tools of the present type are in many respects very similar, and the general construction of the device shown in Fig. 1 will be readily apparent and need not therefore be described in greater detail. A main or motor casing 1 is provided, to which are attached suitable handles 2, in one of which will be disposed the switch mechanism for throwing into and out of circuit the motor 3. The switch mechanism is not described in detail in the present application, as it forms the subject matter of a co-pending application.

The armature of the motor is provided with a suitable spindle 4, one end of which is mounted in bearings 5 at what may be termed the inner end of the motor casing, while the other end of the spindle extends exteriorly of the open end of the motor casing. Adjacent to such extending end of the spindle there is attached a member 6 formed of two spaced and connected disks 7, such member being keyed to the motor spindle and being adapted to serve as a partition across the open end of the motor casing, and to roughly maintain the extending end of the motor spindle in its proper position, although the member 6 is not intended to serve as a bearing for such outer end of the spindle, since this member is of slightly less diameter than the inside of the motor casing. It is desirable in a device of this type to reduce the speed of the motor, and for this purpose gears are provided which operatively connect the motor spindle with a tool-receiving shaft 8 which is suitably mounted to rotate in an auxiliary or second casing 9 which is removably attached to the motor casing about the open end of the same. This second casing 9 is provided with an aperture adapted to permit the entrance of the extending end of the motor shaft and is provided with a packing gland 10 and with a ball bearing 11 which supports the outer end of such spindle and maintains the armature in its proper operating relation to its field magnet. The packing gland 10 is disposed at the outer edge of the second casing 9 for the purpose of securely preventing the escape of any lubricant from within such casing into the open end of the motor casing. The member 6 is an additional safeguard against any such escape of lubricant at least along the spindle 4, as such member is in contact with a flange 12 formed upon the motor spindle. The functions of the member 6 will therefore be seen to be the preventing of any slight amount of lubricant leaking through the packing gland in the second casing into the motor windings, and also to serve as a support or rest for the outer part of the motor spindle when the second casing is removed, and to further serve as a fan which is adapted to maintain the interior of the main casing at a substantially equal temperature by maintaining a current of air therethrough.

The shaft 8 is rotatably mounted in two spaced plain bearings 13 and 14 of generous size, between which there is disposed a thrust ball bearing 15 adapted to take up any longitudinal pressure exerted upon this shaft by the action of the tool which will be held in a chuck 16 of familiar construction. Keyed to the tool shaft 8 is a gear 17 which is adapted to mesh with and be driven by a smaller gear 18 attached to a counter shaft 19 rotatably mounted in the second casing. This counter shaft 19 is provided with a second gear 20 which is engaged by a small gear 21 attached to the end of the motor spindle or formed integral therewith as may be preferred. By this means the desired gear reduction between the motor spindle and the tool shaft may be secured.

The advantages of the present construction are the convenience of assembly secured by means of the second casing which contains all of the gears including the tool shaft, and is adapted to receive the motor spindle through an aperture in the same. This construction permits of the removal of the second casing for the purpose of replacing worn gears or overhauling the same, and also for the purpose of packing this casing with lubricant for the casing and the tool shaft.

Another feature of the invention to which attention is directed is the method of mounting the tool shaft which includes the provision of the two long plain bearings and the disposition between the two of the thrust bearings for taking up the longitudinal thrust on this shaft which is at times very great.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination in an electrically operated tool; of a casing open at one end; a motor armature received in said casing, the spindle of said armature being journaled in the closed end of said casing and extending exteriorly of the open end; a second casing removably clamped to said motor casing about the open end of the same and bearing a rotatable shaft adapted to receive a tool; means adapted to operatively connect the spindle and the shaft, said means being carried entirely in said second casing and being removable therewith; said second casing having one end wall formed integral therewith and serving as a partition to close the open end of said motor casing, such end wall being provided with a bearing for the extending end of such motor spindle and being adapted to prevent the leakage of lubricant from said second casing into said motor casing.

2. The combination in an electrically operated tool; of a casing open at one end; a motor armature received in said casing, the spindle of said armature being journaled in the closed end of said casing and extending exteriorly of the open end; a second casing removably clamped to said motor casing about the open end of the same and bearing a rotatable shaft adapted to receive a tool; means adapted to operatively connect the spindle and the shaft, said means being carried entirely in said second casing and being removable therewith; said second casing having one end wall formed integral therewith and serving as a partition to close the open end of said motor casing, such end wall being provided with a bearing for the extending end of such motor spindle and being adapted to prevent the leakage of lubricant from said second casing into said motor casing; and a packing gland for such shaft mounted in the end wall of said second casing beyond such bearing.

3. The combination in an electrically operated tool; of a casing open at one end; a motor armature received in said casing, the spindle of said armature being journaled in the closed end of said casing and extending exteriorly of the open end; a second casing removably clamped to said motor casing about the open end of the same and bearing a rotatable shaft adapted to receive a tool; means adapted to operatively connect the spindle and the shaft, said means being carried entirely in said second casing and being removable therewith; said second casing having one end wall serving as a partition to close the open end of said motor casing, such end wall being provided with a bearing for the extending end of such motor spindle and being adapted to prevent the leakage of lubricant from said second casing into said motor casing; a packing gland for such shaft mounted in end wall of said second casing beyond such bearing; and a fan attached to such shaft within said motor casing adjacent to the open end of the latter, said fan fitting loosely within said casing and serving to support such shaft in its proper position before the positioning of said second casing.

Signed by me, this 18th day of February 1913.

FRANKLIN SCHNEIDER.

Attested by—
BURTON W. SWEET,
GEORGE W. HEINKEL.

Copies of this patent may be obtained for five cents each, by addressing the "Commissioner of Patents, Washington, D. C."